US012807034B2

(12) United States Patent
Park et al.

(10) Patent No.: US 12,807,034 B2
(45) Date of Patent: Nov. 24, 2026

(54) MOBILITY APPARATUS AND METHOD OF CONTROLLING BATTERY THEREFOR

(71) Applicants: HYUNDAI MOTOR COMPANY, Seoul (KR); KIA CORPORATION, Seoul (KR)

(72) Inventors: Jeong Soo Park, Hwaseong-si (KR); Dae Won Yang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 50 days.

(21) Appl. No.: 18/823,966

(22) Filed: Sep. 4, 2024

(65) Prior Publication Data

US 2025/0083564 A1 Mar. 13, 2025

(30) Foreign Application Priority Data

Sep. 8, 2023 (KR) ........................ 10-2023-0119737

(51) Int. Cl.

| | |
|---|---|
| ***B60L 50/60*** | (2019.01) |
| ***B60L 58/12*** | (2019.01) |
| ***B60L 58/16*** | (2019.01) |
| ***B60L 58/18*** | (2019.01) |

(52) U.S. Cl.

CPC ............... *B60L 58/18* (2019.02); *B60L 58/12* (2019.02); *B60L 58/16* (2019.02); *B60L 50/60* (2019.02)

(58) Field of Classification Search

CPC .......... B60L 58/18; B60L 50/60; B60L 58/12; B60L 58/16; B60L 2210/10; B60L 2240/545; B60L 58/13; B60L 58/20; B60L 2250/12; H01M 10/425; H01M 2010/4271; H01M 2220/20; Y02T 10/70; Y02T 10/7072; Y02T 10/72; B60Y 2200/91; B60Y 2400/112

See application file for complete search history.

(56) References Cited

U.S. PATENT DOCUMENTS

| | | | | |
|---|---|---|---|---|
| 2020/0094691 | A1* | 3/2020 | Vidhi | G07F 15/005 |
| 2022/0126714 | A1* | 4/2022 | Bucknor | B60L 53/53 |
| 2025/0145030 | A1* | 5/2025 | Uchimura | B60L 58/12 |

* cited by examiner

*Primary Examiner* — Elim Ortiz

(74) *Attorney, Agent, or Firm* — MCDONNELL BOEHNEN HULBERT & BERGHOFF LLP

(57) ABSTRACT

A mobility apparatus includes a plurality of first wheels, at least one first drive motor configured to provide a driving force to the plurality of first wheels, a first battery configured to supply power to the at least one first drive motor, and a first controller configured to control the at least one first drive motor and the first battery. In a state in which a second battery is detachably connected to be able to supply power to the at least one drive motor through a DC-DC converter, the first controller determines distribution currents of the first battery and the second battery according to a State of Charge (SoC) of the first battery in response to required torque of a driver.

20 Claims, 8 Drawing Sheets

MOBILITY APPARATUS AND METHOD OF CONTROLLING BATTERY THEREFOR

CROSS REFERENCE TO RELATED APPLICATIONS

This application claims the benefit of Korean Patent Application No. 10-2023-0119737, filed on Sep. 8, 2023, which is hereby incorporated by reference as if fully set forth herein.

BACKGROUND

Field

The present disclosure relates to a mobility apparatus and a method of controlling a battery therefor.

Discussion of the Related Art

In general, an electric vehicle is driven when wheels are driven by a driving force of a drive motor.

Further, in general, a battery is fixedly mounted in the vehicle to supply power to the drive motor.

The drive motor may be an AC motor, and thus an inverter may be included between the battery and the drive motor.

The electric vehicle battery is charged by being supplied with external power through an on-board charger (OBC) when charging is necessary depending on the State of Charge (SoC).

A charging time may be determined depending on the charging method, and is broadly divided into slow charging and fast charging.

With the help of continuous research and development on batteries, a range per charge has been greatly improved in recent years.

However, the battery fixedly mounted in the electric vehicle battery alone may still be insufficient, and therefore, an alternative is needed.

SUMMARY

Accordingly, the present disclosure is directed to a mobility apparatus and a method of controlling a battery therefor that substantially obviate one or more problems due to limitations and disadvantages of the related art.

An object of the present disclosure is to alleviate or solve the aforementioned conventional problems.

Proposed is a new concept of technology using a second battery that may be added to or separated from an electric vehicle power system as needed in addition to a first battery previously installed in an electric vehicle.

Another object of the present disclosure is to provide a control method of suppressing deterioration of the first battery to extend a lifespan thereof, and a mobility apparatus therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a mobility apparatus includes a plurality of first wheels, at least one first drive motor configured to provide a driving force to the plurality of first wheels, a first battery configured to supply power to the at least one first drive motor, and a first controller configured to control the at least one first drive motor and the first battery, wherein, in a state in which a second battery is detachably connected to be able to supply power to the at least one drive motor, the first controller determines distribution currents of the first battery and the second battery according to an SoC of the first battery in response to a request torque.

In at least one embodiment of the present disclosure, the determining of distribution currents may include performing deterioration suppression control on the first battery when the SoC of the first battery is greater than a set first SoC or less than a set second SoC.

In at least one embodiment of the present disclosure, the performing of deterioration suppression control comprises performing a control operation of controlling the distribution current of the first battery to be less than the distribution current of the second battery.

In at least one embodiment of the present disclosure, the determining of distribution currents further comprises canceling the deterioration suppression control when the SoC of the second battery reaches a set value while the deterioration suppression control is performed.

In at least one embodiment of the present disclosure, the first SoC and/or the second SoC is updated according to a driving state of the mobility apparatus.

In at least one embodiment of the present disclosure, the driving state of the mobility apparatus comprises a state of the first battery.

In at least one embodiment of the present disclosure, the determining of distribution currents further comprises comparing the SoC of the first battery with the updated first SoC and/or second SoC as the first SoC and/or the second SoC is updated while the deterioration suppression control is performed.

In at least one embodiment of the present disclosure, the determining of distribution currents further comprises canceling the deterioration suppression control when the SoC of the first battery is less than or equal to the updated first SoC or greater than or equal to the updated second SoC according to a result of the comparing.

In at least one embodiment of the present disclosure, the first controller may be further configured to determine a deterioration suppression control mode for the first battery according to selection of the driver.

In at least one embodiment of the present disclosure, when the SoC of the first battery is greater than the first SoC or less than the second SoC, the first controller may request selection of the driver.

In another aspect of the present disclosure, a method of controlling a battery of a mobility apparatus is provided, wherein the mobility apparatus includes a plurality of first wheels, at least one first drive motor configured to provide a driving force to the plurality of first wheels, a first battery configured to supply power to the at least one first drive motor, and a first controller configured to control the at least one first drive motor and the first battery, and in a state in which a second battery is detachably connected to be able to supply power to the at least one drive motor, the first controller determines distribution currents of the first battery and the second battery according to an SoC of the first battery in response to a request torque.

In a control method of at least one embodiment of the present disclosure, the determining of distribution currents comprises performing deterioration suppression control on the first battery when the SoC of the first battery is greater than a set first SoC or less than a set second SoC.

In a control method of at least one embodiment of the present disclosure, the performing of deterioration suppression control comprises performing a control operation of controlling the distribution current of the first battery to be less than the distribution current of the second battery.

In a control method of at least one embodiment of the present disclosure, the determining of distribution currents further comprises canceling the deterioration suppression control when the SoC of the second battery reaches a set value while the deterioration suppression control is performed.

In a control method of at least one embodiment of the present disclosure, the first SoC and/or the second SoC may be updated according to a driving state of the mobility apparatus.

In a control method of at least one embodiment of the present disclosure, the driving state of the mobility apparatus may include a state of the first battery.

In a control method of at least one embodiment of the present disclosure, the determining of distribution currents may further include comparing the SoC of the first battery with the updated first SoC and/or second SoC as the first SoC and/or the second SoC is updated while the deterioration suppression control is performed.

In a control method of at least one embodiment of the present disclosure, the determining of distribution currents may further include canceling the deterioration suppression control when the SoC of the first battery is less than or equal to the updated first SoC or greater than or equal to the updated second SoC according to a result of the comparing.

In a control method of at least one embodiment of the present disclosure, the first controller may be further configured to determine a deterioration suppression control mode for the first battery according to selection of the driver.

In a control method of at least one embodiment of the present disclosure, when the SoC of the first battery is greater than the first SoC or less than the second SoC, the first controller may request selection of the driver.

It is to be understood that both the foregoing general description and the following detailed description of the present disclosure are exemplary and explanatory and are intended to provide further explanation of the disclosure as claimed.

BRIEF DESCRIPTION OF THE FIGURES

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
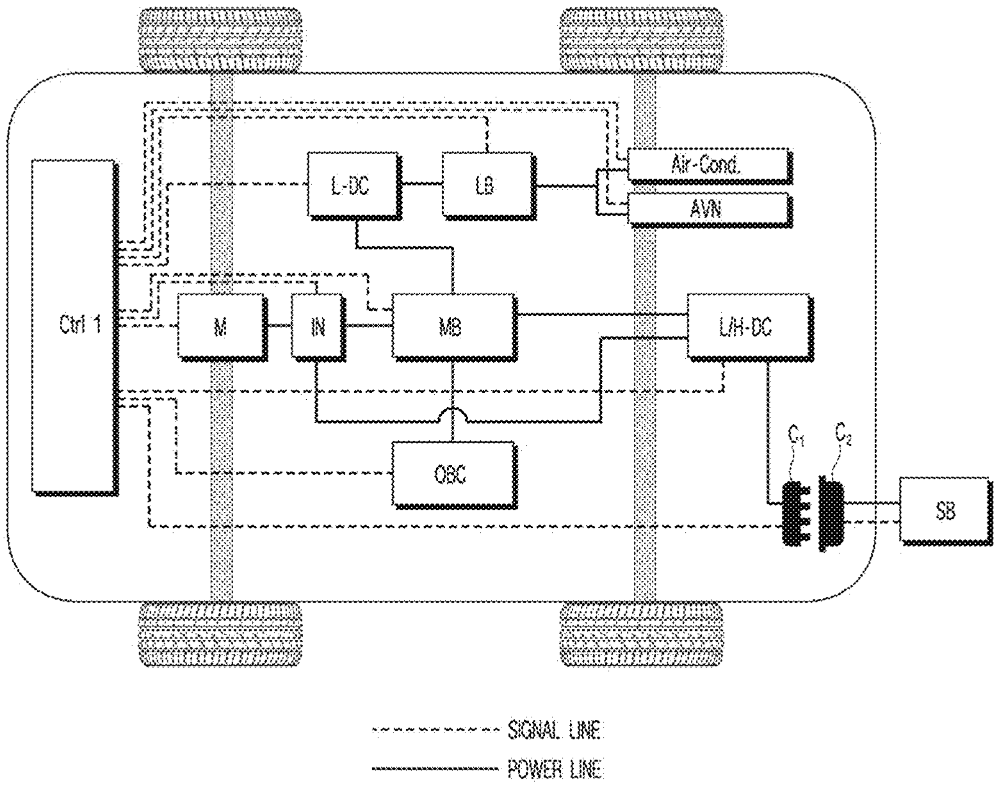
FIG. 1 illustrates a power system of a first mobility apparatus according to one embodiment of the present disclosure.

Since the present disclosure may be variously changed and have several embodiments, specific embodiments are illustrated in drawings and are described. However, this is not to limit the present disclosure to a specific embodiment, and should be understood as including all changes, equivalents, and substitutes included in an idea and a technical scope of the present disclosure.

The suffixes "module" and "unit" used in this specification are used only for nominal distinction between components, and should not be construed as assuming physical and chemical separation or a possibility of physical and chemical separation.

Terms including ordinal numbers, such as "first", "second", etc., may be used to describe various components, but the components are not limited by the terms. The above terms may be used only in a nominal sense to distinguish one component from another component, and a mutual sequential meaning thereof is understood through the context of the corresponding description, not through the name.

The term "and/or" is used to include any combination of a plurality of items that are the subject of the term. For example, "A and/or B" includes all three cases of "A", "B", and "A and B".

When a component is referred to as being "coupled" or "connected" to another component, it should be understood that the component may be directly coupled or connected to the other component, but there may be another component therebetween.

A term used in this application is merely used to describe a specific embodiment, and is not intended to limit the present disclosure. A singular expression, unless the context clearly indicates otherwise, includes a plural expression. In this application, it should be understood that a term such as "include" or "have", etc. is merely intended to designate the presence of a feature, a number, a step, an operation, an element, a part, or a combination thereof described in the present specification, and does not preclude a possibility of presence or addition of one or more other features, numbers, steps, operations, elements, parts, or combinations thereof.

Unless otherwise defined, all terms used herein, including technical or scientific terms, have the same meanings as those generally understood by a person of ordinary skill in the technical field to which the present disclosure pertains. Terms defined in commonly used dictionaries should be interpreted as having meanings consistent with the meanings in the context of the related technology, and should not be interpreted in an ideal or excessively formal sense unless explicitly defined in this application.

In addition, unit, control unit, control device, or controller are only terms widely used to name devices that control the corresponding function, and does not refer to a generic functional unit. For example, devices based on these names may each include a communication device that communicates with other controllers or sensors to control the corresponding function, a computer-readable recording medium that stores an operating system, a logic instruction, input/ output information, etc., and one or more processors that perform determination, calculation, decision, etc. necessary to control a function assigned thereto.

Meanwhile, the processor may include a semiconductor integrated circuit and/or electronic devices that perform at least one of comparison, determination, calculation, and decision to achieve a programmed function. As an example, the processor may be any one or a combination of a computer, a microprocessor, a CPU, an ASIC, and an electronic circuit (circuitry, logic circuits).

In addition, a memory includes all types of storage devices that store data readable by a computer system. Examples thereof may include at least one of memories of a flash memory type, a hard disk type, a micro type, a card type (for example, Secure Digital Card (SD Card) or extreme Digital Card (XD Card)), etc., or memories of types of Random Access Memory (RAM), Static RAM (SRAM), Read-Only Memory (ROM), programmable ROM (PROM), Electrically Erasable PROM (EEPROM), Magnetic RAM (MRAM), magnetic disk, and optical disc.

Such a memory may be electrically connected to the processor, and the processor may retrieve data from the memory and write data. The memory and the processor may be integrated into one body or may be physically separated from each other.

Hereinafter, the attached drawings will be briefly described, and embodiments of the present disclosure will be described in detail with reference to the drawings.

Figure 2:
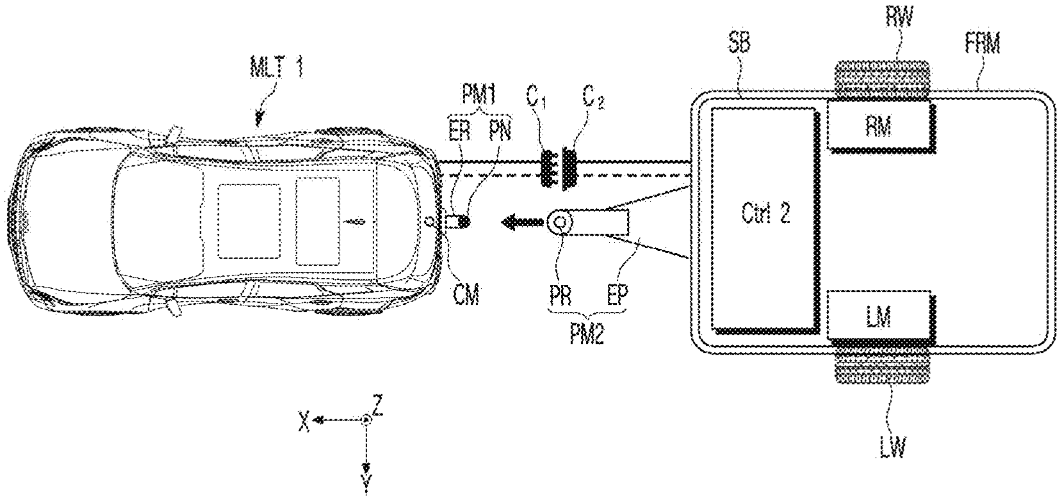
FIG. 2 illustrates a state in which the first mobility apparatus and a second mobility apparatus are connected to each other according to one embodiment of the present disclosure.

FIG. 1 conceptually illustrates a power system of a first mobility apparatus (MLT 1) (for example, an electric vehicle) according to one embodiment of the present disclosure, and FIG. 2 illustrates a state in which a mobility apparatus (MLT 2) is connected to the first mobility apparatus (MLT 1).

Each structure of the first mobility apparatus (MLT 1) and the second mobility apparatus (MLT 2) according to one embodiment of the present disclosure will be described with reference to FIGS. 1 and 2.

As shown in FIG. 1, the first mobility apparatus (MLT 1) according to one embodiment of the present disclosure is, for example, an electric vehicle, and includes a first drive motor (M), an inverter (IN), a first battery (MB), an on-board charger (OBC), a first DC/DC converter (L-DC), a low-voltage battery (LB), an air-conditioning device (Air-cond) and AVN (Audio Video Navigation) operating at low voltage, a second DC/DC converter (L/H-DC), a switch (SW), and a controller (hereinafter referred to as a first controller).

The first drive motor (M) provides driving force to wheels of the vehicle and may be, for example, an alternating current motor.

The inverter (IN) inverts DC power supplied to the first drive motor (M) into alternating current.

The first battery MB may be fixedly installed in a body of the first mobility apparatus (MLT 1), for example, under a cabin floor.

A main function of the first battery (MB) is to supply electric power to the first drive motor (M) and may be charged by the on-board charger (OBC).

In addition, the first battery (MB) may be connected to the low-voltage battery (LB) through the first DC/DC converter (L-DC) to charge the low-voltage battery (LB).

For charging the low-voltage battery (LB), the first DC/DC converter (L-DC) may be a step-down DC/DC converter (low-voltage DC-DC converter (LDC)).

The low-voltage battery (LB) may be, for example, a 12 V or 24 V-battery, and supplies electrical power to an electrical device in the vehicle, such as the air-conditioning device and the AVN operating at low voltage.

A second battery (SB) shown in FIG. 1 is installed in the second mobility apparatus (MLT 2), but is not necessarily limited thereto. As an example, the second battery (SB) may be detachably installed in the first mobility apparatus.

The second battery (SB) may be connected to a vehicle power system including the first battery (MB) additionally, that is, electrically using a wired method (or a wireless method within a possible range) so as to be separable in a way that does not have any effect on an operation of the power system (power supply to vehicle electronics, the drive motor, etc.) even when the second battery (SB) is not present.

In addition, the second battery (SB) may be referred to as a replaceable battery, an auxiliary battery, an extended battery, or a secondary battery, which are merely used for distinguishment from the first battery (MB). In other words, the name of the second battery (SB) does not limit any of a function, a characteristic, a mechanical/electrical/chemical structure thereof or according to a relationship with other objects (including the first battery (MB), a host vehicle, etc.), a battery type (including types of packaging method, anode material/cathode material/separator material, etc.), a charging method, etc.

Communication linkage between the second battery (SB) and the first controller (Ctrl 1) of the first mobility apparatus (MLT 1) or a battery management system (BMS) (described later) of the first battery (MB) is allowed in a wired or wireless manner. In this way, various sensing information (for example, voltage, current, temperature, etc.) related to the SoC and physical/electrical/chemical state of the second battery (SB) are delivered to the first controller (Ctrl 1). However, the present disclosure is not necessarily limited thereto, and the above information related to the second battery (SB) may be transmitted to the first controller (Ctrl 1) through a second controller (Ctrl 2) of the second mobility apparatus (MLT 2), which will be described later.

In the present embodiment, a battery applied to the first battery (MB) and the second battery (SB) may include a plurality of battery cells (not shown) that outputs a unit voltage within, for example, 2.7 to 4.2 V. In addition, a set number of the plurality of battery cells may be connected in series/parallel to each other to form one module. The battery may be packaged in one battery package with one or more battery modules connected in series/parallel to output a desired output voltage, for example, about 400 V, about 800 V, or several kV.

The high-voltage batteries of the first battery (MB) and the second battery (SB) may each include a battery management system (BMS).

The BMS may include a battery management unit (BMU), a cell monitoring unit (CMU), and a battery junction box (BJB).

The BMS performs a cell balancing function to ensure performance of the entire battery pack by maintaining a voltage of each cell constant, an SoC function to calculate capacity of the entire battery system, battery cooling, charging, and discharging control, etc.

The BMU receives information about all cells from the CMU and performs a function of the BMS based thereon.

The BMU may as an example include two microcontroller units (MCUs), and each of the MCUs has one CAN communication port. A CAN interface is included to communicate with the vehicle controller, which may be regarded as an upper device of the BMS, and a CAN interface may be included to collect information from the CMU, which is a lower device.

The CMU may sense voltage, current, and temperature by being directly attached to a battery cell. The CMU does not perform calculation related to a BMS algorithm and may only serve to perform simple sensing. A plurality of battery cells may be connected to one CMU, and information from each cell is delivered to the BMU through the CAN interface.

The BJB is a pack-level detection mechanism of the BMS and is a connection medium between a battery and a drivetrain. A battery voltage and a current flowing into and out of the battery are measured and recorded so that an SoC may be accurately calculated. In addition, the BJB may perform a safety-critical function such as insulation monitoring as well as overcurrent detection.

The second battery (SB) may be a battery having a lower voltage than that of the first battery (MB), and in this case, the second DC/DC converter (L/H-DC) may be a DC/DC converter for step-up. In addition, on the contrary, the second battery (SB) may be a battery having a higher voltage than that of the first battery (MB), and in this case, the second DC/DC converter (L/H-DC) may be a DC/DC converter for step-down.

In the present embodiment, the second DC/DC converter (L/H-DC) is included as a built-in converter in the first mobility apparatus (MLT 1) in the power system, but is not limited thereto. As an example, unlike the present embodiment, the second DC/DC converter (L/H-DC) may be provided as a separate component and additionally and detachably connected to the power system.

In the present embodiment, for detachable electrical connection to the power system of the second battery (SB), the power system of the first mobility apparatus (MLT 1) may include a first connector (C1), and the second battery (SB) may include a second connector (C2). The first connector (C1) is connected to the second DC/DC converter (L/H-DC) as shown.

Meanwhile, although not shown, it is obvious that a signal transmission connector may be added to transmit various sensing and state information of the second battery (SB) to the controller.

In addition to supplying power to the first battery (MB), the second DC/DC converter (L/H-DC) is electrically connected to the inverter (IN), and in this way, power may be directly supplied from the second battery (SB) to the inverter (IN).

Under the control of the first controller (Ctrl 1) and/or the second controller (Ctrl 2), power of the second battery (SB) may be used to charge the first battery (MB), and may be directly used as a power source for the first drive motor (M).

In the present embodiment, the first controller (Ctrl 1) may be an uppermost vehicle controller that controls all electric devices of the first mobility apparatus (MLT 1), but is not necessarily limited thereto. That is, by way of example, the first controller (Ctrl 1) of FIG. 1 may be a power controller subordinate to the vehicle controller.

In addition, in the present embodiment, as described above, the first controller (Ctrl 1) may include a computer-readable recording medium that stores an operating system, a logic instruction, input/output information, etc., and one or more processors that perform reading thereof and perform determination, calculation, decision, etc. necessary to control a function thereof.

The second battery (SB) shown in FIG. 1 may be installed in the second mobility apparatus (MLT 2) as shown in FIG. 2.

The second mobility apparatus (MLT 2) includes a frame (FRM), a second left wheel (LW) installed on the left side of the frame (FRM), a second right wheel (RW) installed on the right side of the frame (FRM), a second left drive motor (LM) that provides a driving force to the second right wheel (RW), a second right drive motor (RM) that provides a driving force to the second right wheel (RW), and the second controller (Ctrl 2).

The second battery (SB) may be fixedly installed in the second mobility apparatus (MLT 2), but is not necessarily limited thereto. That is, the second battery (SB) may be detachably installed in the second mobility apparatus (MLT 2). In this way, the second battery (SB), whose SoC is fully discharged, mounted on the frame (FRM) may be removed and replaced with a new second battery (SB) whose SoC is fully charged.

When the second battery (SB) is fixedly installed in the second mobility apparatus (MLT 2), the second mobility apparatus (MLT 2) may include a charging connector for charging the second battery (SB).

The frame (FRM) forms the exterior of the second mobility apparatus (MLT 2) and serves to accommodate other components.

The frame (FRM) includes a second pivot mechanism (PM2) as a second connection mechanism, and the second pivot mechanism (PM2) may be separably and pivotably connected to the first pivot mechanism (PM1), which is a first connection mechanism fixed to the body of the first mobility apparatus (MLT 1).

As an example, the first pivot mechanism (PM1) includes an extension rod (ER) extending rearwardly from the body of the first mobility apparatus (MLT 1) and a pivot pin (PN) protruding upward from an end of the extension rod (ER).

Further, the second pivot mechanism (PM2) includes a triangular extension part (EP) protruding forward from the frame (FRM) of the second mobility apparatus (MLT 2), and a pivot ring (PR) into which the pivot pin (PN) may be rotatably inserted at an end of the extension part (EP).

The pivot pin (PN) is limited in linear movement while inserted into the pivot ring (PR), and may only rotate about a Z-axis direction of FIG. 2. Therefore, in a pivot-connected state, the second mobility apparatus (MLT 2) is restricted from linear movement about a pivot connection point with respect to the first mobility apparatus (MLT 1) and may only rotate about a Z-axis.

When driving in a forward direction, that is, in an X-axis direction, the first mobility apparatus (MLT 1) and the second mobility apparatus (MLT 2) may maintain straight driving without separate steering control for the second mobility apparatus (MLT 2).

In the present embodiment, the pivot mechanism is included as the first and second connection mechanisms. However, the present disclosure is not necessarily limited thereto. By way of example, the first and second connection mechanisms may be known mechanisms that implement non-rotational connection about the Z-axis.

A rotation axis of the second left drive motor (LM) is connected to the second left wheel (LW), and in this way, the second left drive motor (LM) provides a driving force to the second left wheel (LW).

In addition, a rotation axis of the second right drive motor (RM) is connected to the second right wheel (RW), and in this way, the second right drive motor (RM) provides a driving force to the second right wheel (RW).

The second left wheel (LW) and the second right wheel (RW) are connected to the second left drive motor (LM) and the second right drive motor (RM), respectively, and thus may be mutually independently driven.

Each of the second left drive motor (LM) and the second right drive motor (RM) may be driven in the forward and reverse directions. The second mobility apparatus (MLT 2) travels forward when driven in the forward direction and travels backward when driven in the reverse direction.

As an example, the second left drive motor (LM) and the second right drive motor (RM) may each be implemented as an in-wheel drive system in which the drive motor is installed in the wheel. However, the present disclosure is not necessarily limited thereto.

In addition, unlike the present embodiment, rather than the left and right sides of the second mobility apparatus (MLT 2) being independently driven, power of one common motor may be divided and transmitted to the second left wheel (LW) and the second right wheel (RW). To this end, a differential gear may be included between the common second drive motor and the second left wheel (LW) and the second right wheel (RW). That is, power of the common second drive motor may be distributed by the differential gear and transmitted to the second left wheel (LW) and the second right wheel (RW). In this case, a torque vectoring means may be added to distribute torque between the second left wheel (LW) and the second right wheel (RW).

In FIG. 2, the second controller (Ctrl 2) controls the second left drive motor (LM) and the second right drive motor (RM) to achieve forward and reverse travel of the second mobility apparatus (MLT 2). In addition, when steering of the second mobility apparatus (MLT 2) is required, the second controller (Ctrl 2) may change a traveling direction of the second mobility apparatus (MLT 2) by controlling torque or a rotation speed of each of the second left drive motor (LM) and the second right drive motor (RM). That is, through independent control of driving of the second left drive motor (LM) and the second right drive motor (RM), steering of the second mobility apparatus (MLT 2) may be achieved without a separate steering device.

Further, as described above, a wired or wireless communication means for transferring information between the connectors of FIG. 1 and the first mobility apparatus (MLT 1) and the second mobility apparatus (MLT 2) is included.

Meanwhile, in the present embodiment, the first controller (Ctrl 1) or the second controller (Ctrl 2) may include a memory and a processor. The memory stores computer instructions for performing the functions of the controller, and the processor performs the above functions by fetching the instructions from the memory and executing the instructions.

The memory as an example includes at least one of a hard disk drive (HDD), a solid-state drive (SDD), a silicon disk drive (SDD), a ROM, a RAM, a CD-ROM, a magnetic tape, a floppy disk, or an optical data storage device.

Further, the processor as an example includes at least one of a computer, a microprocessor, a central processing unit (CPU), an ASIC, an electric circuit, or a logic circuit.

As the first connector (C1) of the first mobility apparatus (MLT 1) and the second connector (C2) of the second mobility apparatus (MLT 2) are connected and the signal transmission connector is connected, the first mobility apparatus (MLT 1) and the second mobility apparatus (MLT 2), that is, the first controller (Ctrl 1) and the second controller (Ctrl 2), are in a state where mutual communication therebetween is allowed.

When the first mobility apparatus (MLT 1) starts traveling forward while the first mobility apparatus (MLT 1) and the second mobility apparatus (MLT 2) are mechanically and electrically connected, the second controller (Ctrl 2) performs straight ahead driving of the second mobility apparatus (MLT 2) by controlling the second left drive motor (LM) and the second right drive motor (RM) according to a signal transmitted from the first connector (C1).

In this instance, some or all of a speed, a gear position, a steering angle, APS (accelerator pedal sensor) information, and BPS (brake pedal sensor) information of the first mobility apparatus (MLT 1) may be transmitted to the second mobility apparatus (MLT 2).

As an example, the second controller (Ctrl 2) of the second mobility apparatus (MLT 2) may determine whether the first mobility apparatus (MLT 1) is in a forward driving state or a backward driving state using some or all of the speed, the gear position, the APS information, and the BPS information of the first mobility apparatus (MLT 1). However, the present disclosure is not limited thereto, and it is obvious that information on whether the first mobility apparatus (MLT 1) is in a forward driving state or a backward driving state may be directly received from the first controller (Ctrl 1).

When the first mobility apparatus (MLT 1) is traveling forward, the second controller (Ctrl 2) performs straight ahead driving of the second mobility apparatus (MLT 2) by driving the second left drive motor (LM) and the second right drive motor (RM) in the forward direction. Further, when the first mobility apparatus (MLT 1) is traveling backwards, the second controller (Ctrl 2) performs reverse driving of the second mobility apparatus (MLT 2) by driving the second left drive motor (LM) and the second right drive motor (RM) in the reverse direction.

In addition, the second controller (Ctrl 2) may determine a steering state using steering angle information of the first mobility apparatus (MLT 1) and perform steering of the second mobility apparatus (MLT 2) accordingly.

The second mobility apparatus (MLT 2) does not include a separate steering device such as a steering wheel, steering rack, etc., and steering may be performed through torque control of the second left drive motor (LM) and the second right drive motor (RM).

That is, the second controller (Ctrl 2) may calculate driving torque for driving and steering torque for steering for each of the second left drive motor (LM) and the second right drive motor (RM) and use the driving torque and the steering torque for control.

As an example, to achieve steering of the second mobility apparatus (MLT 2), steering torque values of the second left drive motor (LM) and the second right drive motor (RM) according to a steering angle of the first mobility apparatus (MLT 1) may be included in a lookup table or a calculation program.

When driving straight ahead, a speed of the second mobility apparatus (MLT 2) may be controlled so that the speed is not greater than that of the first mobility apparatus (MLT 1). In this way, pivot connection between the first mobility apparatus (MLT 1) and the second mobility apparatus (MLT 2) may be maintained within a predetermined pivot angle range. For example, when driving straight ahead, if the speed of the second mobility apparatus (MLT 2) is controlled so that the speed is not greater than that of the first mobility apparatus (MLT 1), a pivot angle of the second mobility apparatus with respect to the first mobility apparatus (MLT 1) at a pivot connection point may be maintained at 0 degrees (meaning an angle at which the first mobility apparatus (MLT 1) and the second mobility apparatus (MLT 2) are in a straight line).

When driving forward, the second mobility apparatus (MLT 2) may be controlled so that the second mobility apparatus (MLT 2) follows the first mobility apparatus (MLT 1), and in this way, smooth platooning of a plurality of mobilities may be achieved.

Hereinafter, a control process according to one embodiment of the present disclosure will be described through FIGS. 3 to 5.

Figure 3:
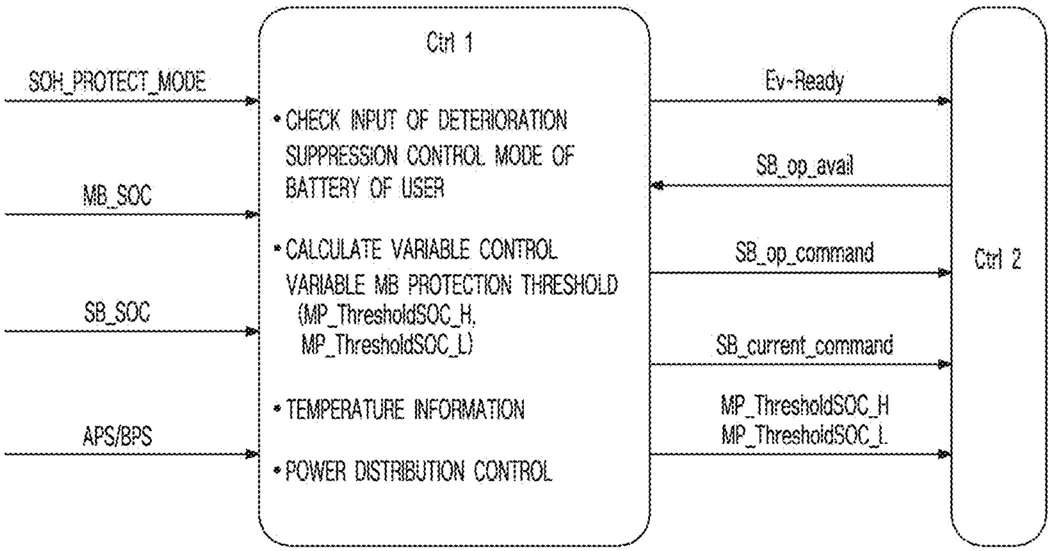
FIG. 3 illustrates input and output information of a first controller according to one embodiment of the present disclosure.
Figure 4:
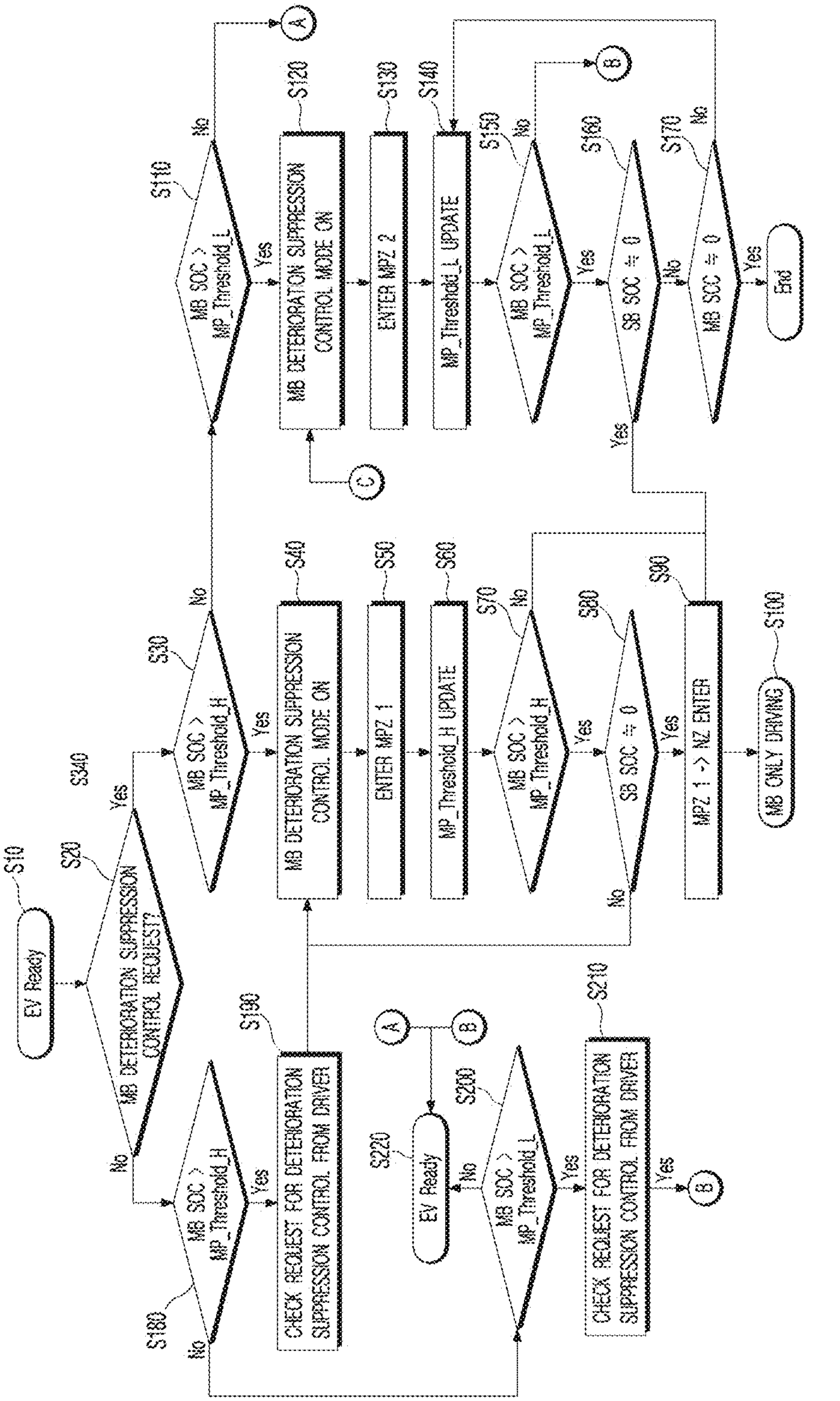
FIG. 4 illustrates a control process according to one embodiment of the present disclosure.

First, FIG. 3 illustrates input/output information of the first controller (Ctrl 1) and the second controller (Ctrl 2) according to one embodiment of the present disclosure.

As shown in FIG. 3, the first controller (Ctrl 1) receives, as input information, information on whether a deterioration suppression control mode of the first battery (MB) is selected (SOH_PROTECT_MODE), SoC (MB_SOC) of the first battery (MB) (MB_SOC), SoC (SB_SOC) of the second battery (SB) (SB_SOC), APS and/or BPS information, operation availability information of the second battery (SB) (SB_op_avail), etc., and transmits, to the second controller (Ctrl 2), starting state information (Ev_Ready) of the first mobility apparatus (MLT 1), operation command (SB_op_command) for the second battery (SB), distribution current information (SB_current_command) for the second battery (SB), first SoC (MP_ThresholdSOC_H) and second SoC (MP_ThresholdSOC_L) information, etc.

The first controller (Ctrl 1) may receive the information on whether the deterioration suppression mode of the first battery (MB) is selected (SOH_PROTECT_MODE) through a user interface. As an example, the user interface is provided as an AVN screen, and in this way a driver may select the mode.

APS/BPS information may be received from an accelerator pedal sensor and a brake pedal sensor.

Further, information on the SoC (MB_SOC) of the first battery (MB) (MB_SOC) and the SoC (SB_SOC) of the second battery (SB) (SB_SOC) may be received from the BMSs of the first battery (MB) and the second battery (SB), respectively. It is obvious that the information on the SoC (SB_SOC) of the second battery (SB) (SB_SOC) may be received from the second controller (Ctrl 2) as described above.

A first SoC (MP_ThresholdSOC_H) and a second SoC (MP_ThresholdSOC_L), which are thresholds of the first battery (MB), may be stored in the memory.

In addition, the first controller (Ctrl 1) may update the first SoC (MP_ThresholdSOC_H) and the second SoC (MP_ThresholdSOC_L) according to a driving state of the first mobility apparatus (MLT 1). In the present embodiment, the first SoC (MP_ThresholdSOC_H) and the second SoC (MP_ThresholdSOC_L) may vary depending on the state of the first battery (MB), but are not necessarily limited thereto.

Here, the state of the first battery (MB) may include a parameter value related to battery deterioration. For example, the first SoC (MP_ThresholdSOC_H) and the second SoC (MP_ThresholdSOC_L) may be changed and updated according to a temperature of the first battery (MB). As an example, when the temperature of the first battery (MB) is outside a set range, the first SoC (MP_ThresholdSOC_H) may be slightly changed, and the second SoC (MP_ThresholdSOC_L) may be greatly changed and updated.

In addition, the first SoC (MP_ThresholdSOC_H) and the second SoC (MP_ThresholdSOC_L) may vary depending on the state of the second battery (SB). As an example, the first SoC (MP_ThresholdSOC_H) and the second SoC (MP_ThresholdSOC_L) may be changed and updated depending on the SoC (SB_SOC), temperature, etc. of the second battery (SB).

In addition, the first SoC (MP_ThresholdSOC_H) and the second SoC (MP_ThresholdSOC_L) may vary depending on the required torque. For example, when the required torque is large, the first SoC (MP_ThresholdSOC_H) may increase, and when the required torque is small, the first SoC (MP_ThresholdSOC_H) may be decreased.

Hereinafter, the entire control process of one embodiment of the present disclosure will be described in detail with reference to FIG. 4.

Step S10 means that the first mobility apparatus (MLT 1) is in a drivable state. That is, step S10 is an "EV Ready" state in which current is supplied to the first drive motor (M) and driving is possible at any time when the driver presses an accelerator pedal.

The first controller (Ctrl 1) verifies whether a deterioration suppression control mode for the first battery (MB) is selected in step S20.

A user interface for selecting the deterioration suppression control mode for the first battery (MB) may be provided on an AVN screen, and the driver may select the mode by selecting the corresponding button on the screen.

When the mode is selected (Yes in S20), the first controller (Ctrl 1) verifies whether the SoC of the first battery (MB) is greater than the first SoC (MP_ThresholdSOC_H) in step S30.

Upon determining that the SoC of the first battery (MB) is greater than the first SoC (MP_ThresholdSOC_H), the first controller (Ctrl 1) switches the deterioration suppression control mode of the first battery (MB) to an on state in step S40.

Then, the first controller (Ctrl 1) proceeds with the deterioration suppression control mode in step S50. The progress of the deterioration suppression control mode will be described later.

The first controller (Ctrl 1) proceeds with the mode and updates the first SoC (MP_ThresholdSOC_H) in step S60.

After updating, the first controller (Ctrl 1) determines whether a current SoC of the first battery (MB) is greater than the updated first SoC (MP_ThresholdSOC_H) in step S70.

When the SoC (MB_SOC) of the first battery (MB) is still greater than the first SoC (MP_ThresholdSOC_H) (Yes in S70), the deterioration suppression control mode continues, and in step S80, it is determined whether an available SoC of the second battery (SB) reaches 0 (zero), that is, "Empty". In this instance, when the SoC (MB_SOC) of the first battery (MB) is not greater than the first SoC (MP_ThresholdSOC_H) (No in S70), step S90, which will be described later, is performed.

Upon determining that the available SoC of the second battery (SB) has reached 0 (zero) (Yes in S80), the first controller (Ctrl 1) cancels the progress of the deterioration suppression control mode in step S90. Further, thereafter, the first controller (Ctrl 1) uses only power of the first battery (MB) as driving power of the first mobility apparatus (MLT 1) (S100).

Upon determining in step S80 that the available SoC of the second battery (SB) has not reached 0 (zero) (No in S80), the process returns to step S40.

In step S30, upon determining that the SoC (MB_SOC) of the first battery (MB) is less than or equal to the first SoC (MP_ThresholdSOC_H) (Yes in S30), the first controller (Ctrl 1) determines in S110 whether the SoC (MB_SOC) of the first battery (MB) is smaller than the second SoC (MP_ThresholdSOC_L).

When the SoC (MB_SOC) of the first battery (MB) is smaller than the second SoC (MP_ThresholdSOC_L), the first controller (Ctrl 1) switches the deterioration suppression control mode of the first battery (MB) to the on state in step S120.

Then, the first controller (Ctrl 1) proceeds with the deterioration suppression control mode in step S130.

The first controller (Ctrl 1) proceeds with the mode and updates the second SoC (MP_ThresholdSOC_L) in step S140.

After updating, the first controller (Ctrl 1) determines whether the current SoC of the first battery (MB) is less than the updated second SoC (MP_ThresholdSOC_L) in step S150.

When the SoC (MB_SOC) of the first battery (MB) is still less than the second SoC (MP_ThresholdSOC_L) (Yes in S150), the deterioration suppression control mode continues, and in step S160, it is determined whether the available SoC of the second battery (SB) reaches 0 (zero), that is, "Empty".

Upon determining that the available SoC of the second battery (SB) has reached 0 (zero) (Yes in S160), the first controller (Ctrl 1) cancels the process of the deterioration suppression control mode in step S90. However, when the SoC (SB_SOC) of the second battery (SB) has not reached 0 (zero) (No in S160), the first controller (Ctrl 1) verifies whether the SoC (MB_SOC) of the first battery (MB) has reached 0 (zero), that is, "Empty", in step S170.

When the SoC (MB_SOC) of the first battery (MB) has reached 0 (zero), that is, "Empty" (Yes in S170), control is terminated, and the process returns to step S140 otherwise (No in S170).

When "No" is determined in steps S110 and S150, the progress of the deterioration suppression control mode is canceled in step S220.

Meanwhile, when there is no user selection for the deterioration suppression control mode in step S20 (No in S20), the first controller (Ctrl 1) determines whether the SoC (MB_SOC) of the first battery (MB) is greater than the first SoC (MP_ThresholdSOC_H) in step S180.

Further, upon determining that the SoC (MB_SOC) of the first battery (MB) is greater than the first SoC (MP_ThresholdSOC_H) in step S180, the first controller (Ctrl 1) checks a request for deterioration suppression control from the driver again in step S190. To this end, the first controller (Ctrl 1) may output a pop-up window to confirm intention of the driver regarding selection of the deterioration suppression control mode through the AVN screen. For example, it is possible to output a pop-up window saying, "The state of the first battery (MB) is unstable. Would you like to select the deterioration suppression control mode?"

When the deterioration suppression control mode is selected by the driver in step S190, the process proceeds to the above-described step S40.

In addition, upon determining in step S180 that the SoC (MB_SOC) of the first battery (MB) is not greater than the first SoC (MP_ThresholdSOC_H) (No in S180), the first controller (Ctrl 1) determines in step S200 whether the SoC (MB_SOC) of the first battery (MB) is smaller than the second SoC (MP_ThresholdSOC_L).

Upon determining in step S200 that the SoC (MB_SOC) of the first battery (MB) is not less than the second SoC (MP_ThresholdSOC_L) (No in S200), the first controller (Ctrl 1) performs normal control rather than the deterioration suppression control mode in step S220.

However, upon determining in step S200 that the SoC (MB_SOC) of the first battery (MB) is smaller than the second SoC (MP_ThresholdSOC_L) (Yes in S200), the request for deterioration suppression control from the driver is checked again in step S210 as in step S190. When the driver selects the deterioration suppression control mode through a pop-up window in step S210, the process proceeds to step S120 described above.

Figure 5:
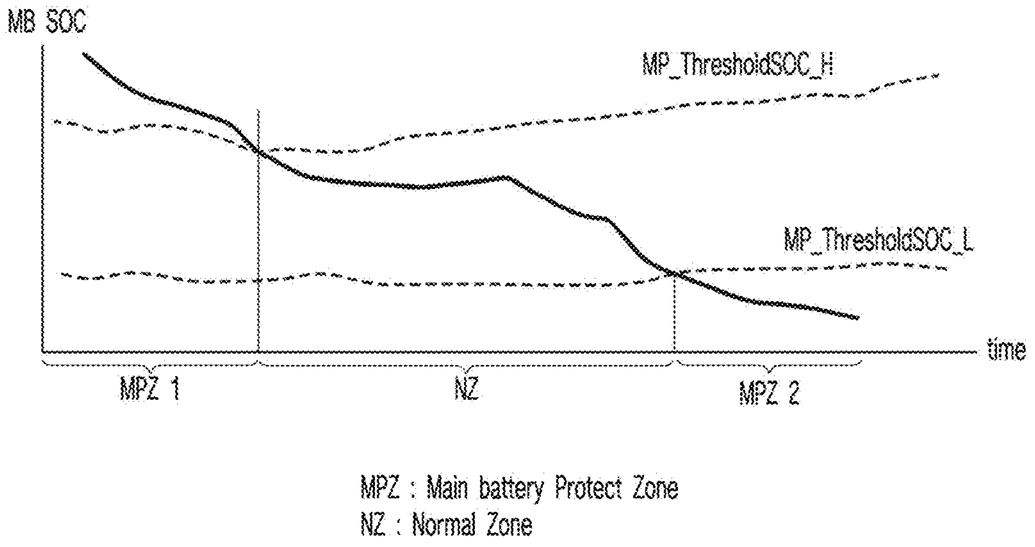
FIG. 5 illustrates that a first SoC and a second SoC are variable in one embodiment of the present disclosure.

FIG. 5 illustrates that the first SoC (MP_ThresholdSOC_H) and the second SoC (MP_ThresholdSOC_L) are variable in one embodiment of the present disclosure, which will be described below.

As shown in FIG. 5, the first SoC (MP_ThresholdSOC_H) and the second SoC (MP_ThresholdSOC_L) may vary depending on time while driving the first mobility apparatus (MLT 1), and the deterioration suppression control mode is entered and exited according to the SoC (MB_SOC) of the first battery (MB) based on the first SoC (MP_ThresholdSOC_H) and the second SoC (MP_ThresholdSOC_L) that are variable as such.

FIG. 5 illustrates that the first battery (MB) is in a section (MPZ 1) that requires protection when the SoC (MB_SOC) of the first battery (MB) is greater than the first SoC (MP_ThresholdSOC_H), and illustrates that the first battery (MB) is in a section (MPZ 2) that requires protection when the SoC (MB_SOC) of the first battery (MB) is less than the second SoC (MP_ThresholdSOC_L).

Further, in the sections (MPZ 1 and MPZ 2) that require protection, the deterioration suppression control mode of the present embodiment is performed.

In FIG. 5, "NZ" refers to a normal mode section that does not require the deterioration suppression control mode of the present embodiment for the first battery (MB).

Meanwhile, in the deterioration suppression control mode of the present embodiment, the first controller (Ctrl 1) determines the required torque of the first drive motor (M) based on APS and/or BPS information and determines the required power required therefor.

Further, to satisfy the required power, distribution currents of the first battery (MB) and the second battery (SB) is determined. In the deterioration suppression control mode, the distribution current of the second battery (SB) is determined to be greater than the distribution current of the first battery (MB).

In this way, when the SoC (MB_SOC) of the first battery (MB) is in an unstable region, output of high current is limited and deterioration of the first battery (MB) is alleviated.

As an example, the distribution current of the first battery (MB) in the deterioration suppression control mode may be determined by a set equation or a look-up table stored in the memory.

For example, depending on the state (temperature, SoC, etc.) of the first battery (MB), a current value that may minimize deterioration may be determined through experimentation, and experiment data may be stored in a memory as a look-up table.

Figure 6:
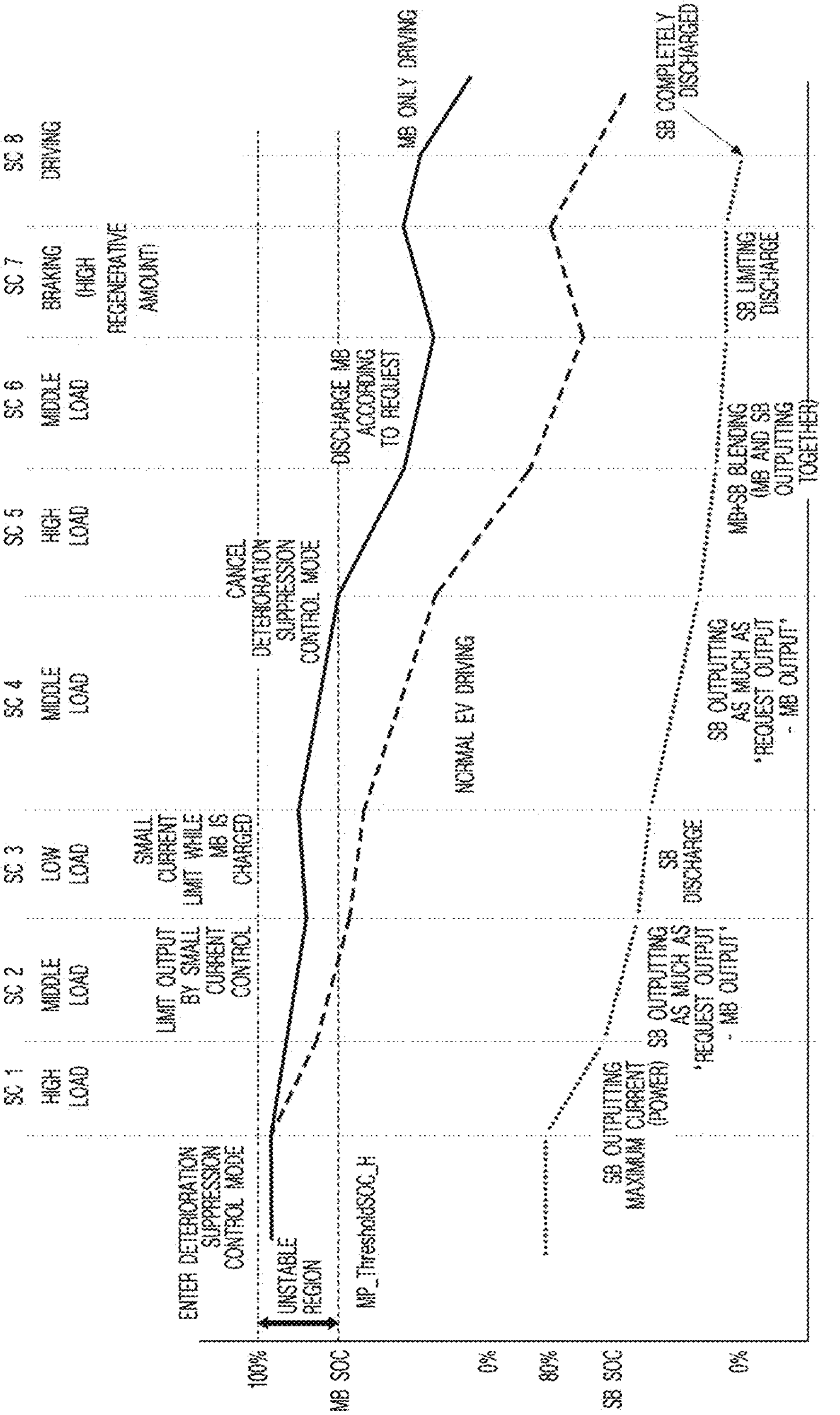
FIGS. 6, 7, and 8 illustrate a process in which current is distributed to a first battery and a second battery by control according to one embodiment of the present disclosure during mobility apparatus driving.
Figure 7:
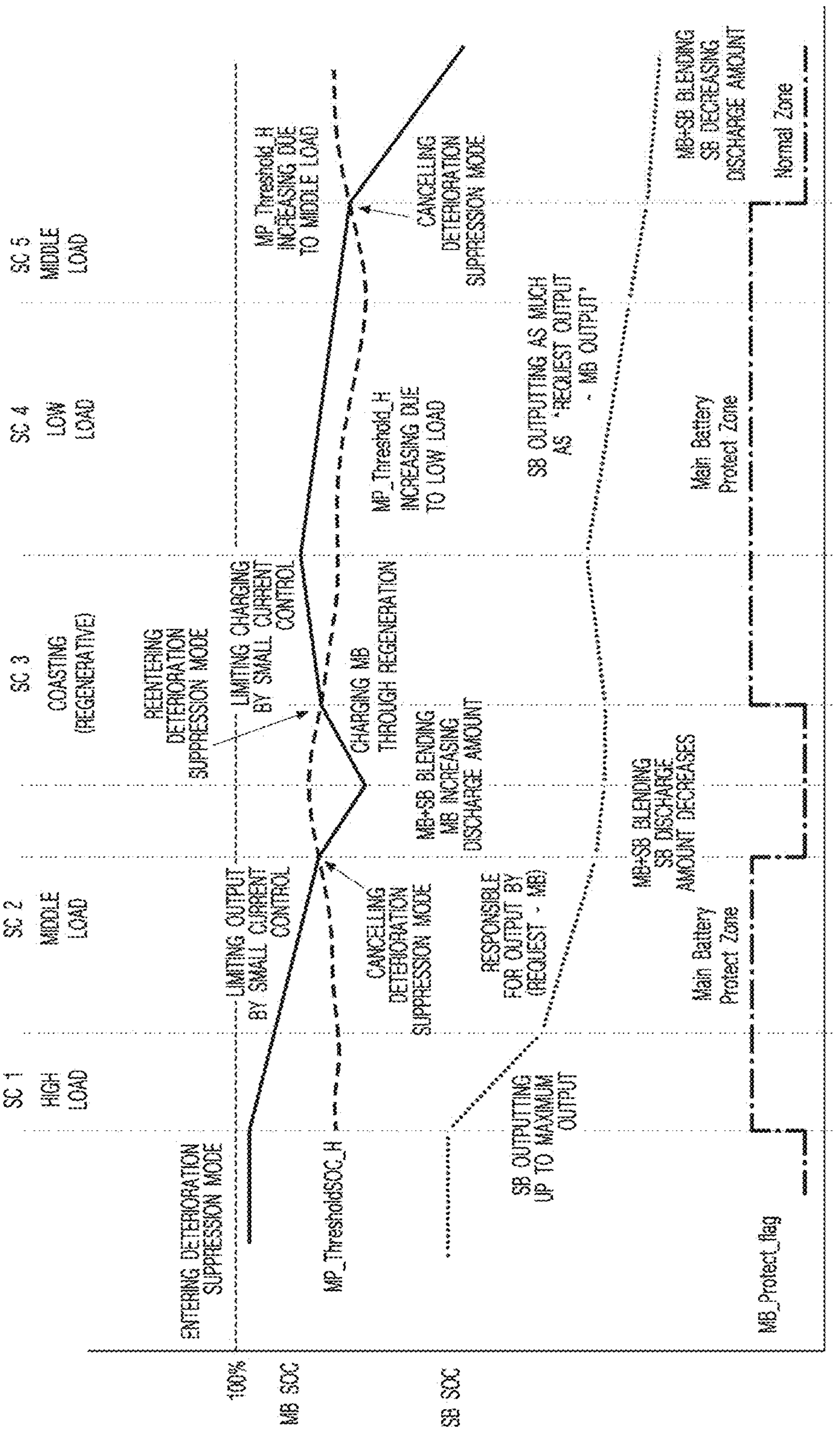

FIGS. 6 and 7 illustrate a process in which currents are distributed to the first battery (MB) and the second battery (SB) during driving of the first mobility apparatus (MLT 1) by control according to an embodiment of the present disclosure, which will be described below.

First, FIG. 6 illustrates a case in which the deterioration suppression control mode proceeds while the SoC (MB_SOC) of the first battery (MB) is 80% or more.

Referring to FIG. 6, since the SoC (MB_SOC) of the first battery (MB) is greater than the first SoC (MP_ThresholdSOC_H), the first mobility apparatus (MLT 1) enters the deterioration suppression control mode.

After entry, the first battery (MB) in a first section (SC 1) and a second section (SC 2) outputs current through small current control since distribution current is determined to be minimum.

In this instance, the second battery (SB) is controlled so that the second battery (SB) outputs a maximum current in response to high load torque required by the driver in the first section (SC 1). Further, as the required torque decreases to a middle load in the second section (SC 2), a control operation is performed to output a current obtained by excluding a distribution current of the first battery (MB) from the required current.

In a low load state of a third section (SC 3), output of the first battery (MB) is maintained under low current control, and the second battery (SB) is controlled so that the second battery (SB) charges the first battery (MB) while responding to the required torque.

In a middle load state of a fourth section (SC 4), the first battery (MB) is still controlled by small current output in the deterioration suppression control mode, and the second battery (SB) is controlled so that the second battery (SB) outputs a current obtained by subtracting the distribution current of the first battery (MB) from the required current corresponding to the required torque.

In a fifth section (SC 5), as the SoC (MB_SOC) of the first battery (MB) becomes smaller than the first SoC (MP_ThresholdSOC_H), the deterioration suppression control mode is canceled. In this instance, the distribution currents of the first battery (MB) and the second battery (SB) may be determined according to a distribution ratio set to respond to the required torque. As an example, the distribution current of the first battery (MB) may be determined to be greater than the distribution current of the second battery (SB) depending on the SoC (SB_SOC) of the second battery (SB).

The sixth section (SC 6) is a middle load section, and a control operation may be performed so that most of the required torque is covered by the distribution current of the first battery (MB) as in the fifth section (SC 5).

A seventh section (SC 7) is a regenerative braking section, and is a section in which the first battery (MB) is charged by regenerative braking.

Further, in an eighth section (SC 8), as driving continues, the second battery (SB) is fully discharged, and subsequent driving is performed only by power of the first battery (MB).

In FIG. 6, "normal EV driving" represents a case in which the deterioration suppression control mode of the present embodiment is not used. As shown in FIG. 6, discharge of the first battery (MB) is accelerated, and there is no limitation on the output current in the first section (SC 1) to the fourth section (SC 4), and thus deterioration of the first battery (MB) may be accelerated.

FIG. 6 illustrates a case in which the first SoC (MP_ThresholdSOC_H) is fixed. However, FIG. 7 illustrates a case where the SoC (MB_SOC) of the first battery (MB) is also 80%, but the first SoC (MP_ThresholdSOC_H) is variable.

Referring to FIG. 7, in the first section (SC 1), the deterioration suppression control mode is entered, the first battery (MB) is controlled so that the first battery (MB) outputs a small current, and the second battery (SB) is responsible for most of the required torque and is controlled so that the second battery (SB) outputs maximum current.

In the second section (SC 2), the required torque is switched to the middle load state, the first battery (MB) is still controlled by small current output, and output of the second battery (SB) is controlled so that the second battery (SB) is responsible for most of the current necessary for the required torque.

In this instance, as the first SoC (MP_ThresholdSOC_H) is changed and updated in the second section (SC 2), the SoC (MB_SOC) of the first battery (MB) becomes smaller than the updated first SoC (MP_ThresholdSOC_H), and thus the deterioration suppression control mode is canceled.

After the mode is canceled in the second section (SC 2), the first battery (MB) and the second battery (SB) share responsibility for the required torque according to settings in the normal mode.

As coasting driving progresses in the third section (SC 3), the first battery (MB) is charged by regenerative braking, the SoC (MB_SOC) of the first battery (MB) exceeds the first SoC (MP_ThresholdSOC_H) again accordingly, and the deterioration suppression control mode proceeds again.

When the deterioration suppression control mode proceeds in the third section (SC 3), the first battery (MB) is again controlled by small current output.

In the fourth section (SC 4), the required torque is in a low load state, the deterioration suppression control mode continues, and the first SoC (MP_ThresholdSOC_H) becomes small.

In the fifth section (SC 5) the load is switched to the middle load, the first SoC (MP_ThresholdSOC_H) increases again, and the SoC (MB_SOC) of the first battery (MB) falls below the first SoC (MP_ThresholdSOC_H), so that the deterioration suppression control mode is canceled.

Figure 8:
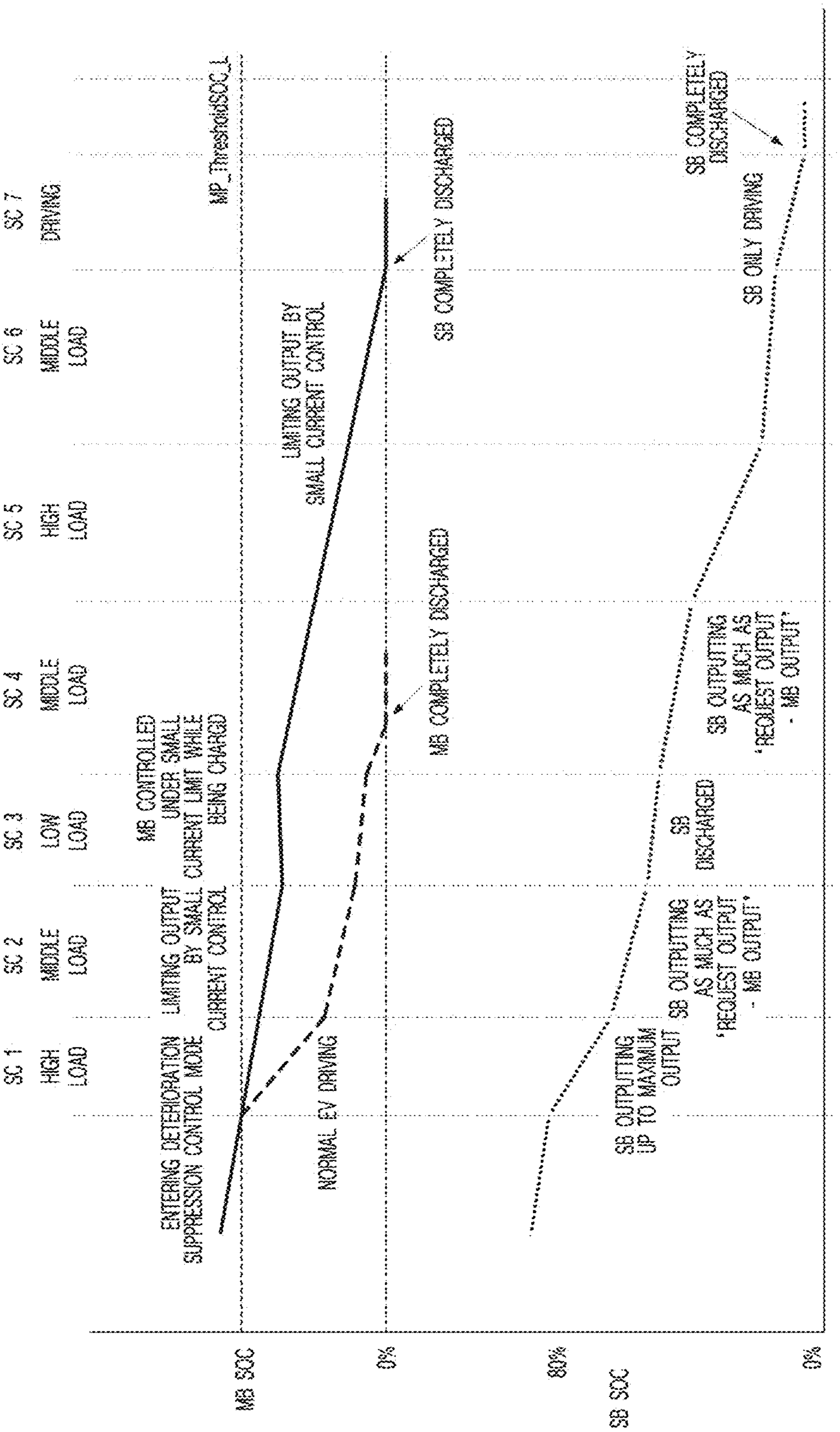

FIG. 8 illustrates a case where the SoC (MB_SOC) of the first battery (MB) is 20%, which will be described below.

First, in a first section (SC 1), as the SoC (MB_SOC) of the first battery (MB) becomes smaller than the second SoC (MP_ThresholdSOC_L), the deterioration suppression control mode proceeds.

Due to the deterioration suppression control mode, the first battery (MB) is controlled by small current output up to a second section (SC 2), and the second battery (SB) is responsible for most of the required torque.

In a third section (SC 3), as the state switches to a low load state, the first battery (MB) may be charged using the second battery (SB), and in this instance, the first battery (MB) is still maintained by small current output control.

From a fourth section (SC 4) to a seventh section (SC 7), the first battery (MB) is maintained by small current output control in the deterioration suppression control mode.

The second battery (SB) is controlled so that the second battery (SB) is responsible for a current obtained by subtracting the distribution current of the first battery (MB) from the required current up to the sixth section (SC 6), and is controlled so that the second battery (SB) is responsible for the entire required torque as the first battery (MB) is completely discharged in the seventh section (SC 7).

In the case of FIG. 8, when the deterioration suppression control mode according to the present embodiment is not used, the first battery (MB) is already completely discharged in the fourth section (SC 4).

According to one embodiment of the present disclosure, it is possible to obtain a new concept of mobility apparatus using a second battery that may be added to and separated from a power system as needed in addition to a first battery previously installed.

According to one embodiment of the present disclosure, deterioration of a battery of a mobility apparatus may be suppressed to extend a lifespan thereof.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. A mobility apparatus comprising:

a plurality of first wheels;

at least one first drive motor configured to provide driving force to the plurality of first wheels;

a first battery configured to supply power to the at least one first drive motor; and a first controller configured to control the at least one first drive motor and the first battery;

wherein, in a state in which a second battery is detachably connected to supply power to the at least one first drive motor, the first controller is configured to determine a first distribution current of the first battery and a second distribution current of the second battery based on a State of Charge (SoC) of the first battery and at least one set reference SoC in response to a request torque, wherein the first distribution current is supplied to the at least one first drive motor to supply a first power and the second distribution current is supplied to the at least one first drive motor to supply a second power, and wherein a sum of the first power and the second power corresponds to a request power for the request torque.

2. The mobility apparatus according to claim 1, wherein the determining of distribution currents comprises performing deterioration suppression control on the first battery when the SoC of the first battery is greater than a set first SoC or less than a set second SoC.

3. The mobility apparatus according to claim 2, wherein the performing of deterioration suppression control comprises performing a control operation of controlling the distribution current of the first battery to be less than the distribution current of the second battery.

4. The mobility apparatus according to claim 3, wherein the determining of distribution currents further comprises canceling the deterioration suppression control when an SoC of the second battery reaches a set value while the deterioration suppression control is performed.

5. The mobility apparatus according to claim 2, wherein the first SoC or the second SoC is updated according to a driving state of the mobility apparatus.

6. The mobility apparatus according to claim 5, wherein the driving state of the mobility apparatus comprises a state of the first battery.

7. The mobility apparatus according to claim 6, wherein the determining of distribution currents further comprises comparing the SoC of the first battery with the updated first SoC or second SoC as the first SoC or the second SoC is updated while the deterioration suppression control is performed.

8. The mobility apparatus according to claim 7, wherein the determining of distribution currents further comprises canceling the deterioration suppression control when the SoC of the first battery is less than or equal to the updated first SoC or greater than or equal to the updated second SoC according to a result of the comparing.

9. The mobility apparatus according to claim 2, wherein the first controller is further configured to determine a deterioration suppression control mode for the first battery according to selection of a driver.

10. The mobility apparatus according to claim 9, wherein, when the SoC of the first battery is greater than the first SoC or less than the second SoC, the first controller requests selection of the driver.

11. A method of controlling a battery of a mobility apparatus, the mobility apparatus comprising a plurality of first wheels, at least one first drive motor configured to provide a driving force to the plurality of first wheels, a first battery configured to supply power to the at least one first drive motor, and a first controller configured to control the at least one first drive motor and the first battery;

wherein, when a second battery is detachably connected to supply power to the at least one first drive motor, the first controller determines a first distribution current of the first battery and a second distribution current of the second battery based on an SoC of the first battery and at least one set reference SoC in response to a request torque, wherein the first distribution current is supplied to the at least one first drive motor to supply a first power and the second distribution current is supplied to the at least one first drive motor to supply a second power, and wherein a sum of the first power and the second power corresponds to a request power for the request torque.

12. The method according to claim 11, wherein the determining of distribution currents comprises performing deterioration suppression control on the first battery when the SoC of the first battery is greater than a set first SoC or less than a set second SoC.

13. The method according to claim 12, wherein the performing of deterioration suppression control comprises performing a control operation of controlling the distribution current of the first battery to be less than the distribution current of the second battery.

14. The method according to claim 13, wherein the determining of distribution currents further comprises canceling the deterioration suppression control when an SoC of the second battery reaches a set value while the deterioration suppression control is performed.

15. The method according to claim 12, wherein the first SoC or the second SoC is updated according to a driving state of the mobility apparatus.

16. The method according to claim 15, wherein the driving state of the mobility apparatus comprises a state of the first battery.

17. The method according to claim 16, wherein the determining of distribution currents further comprises comparing the SoC of the first battery with the updated first SoC or second SoC as the first SoC or the second SoC is updated while the deterioration suppression control is performed.

18. The method according to claim 17, wherein the determining of distribution currents further comprises canceling the deterioration suppression control when the SoC of the first battery is less than or equal to the updated first SoC or greater than or equal to the updated second SoC according to a result of the comparing.

19. The method according to claim 12, wherein the first controller is further configured to determine a deterioration suppression control mode for the first battery according to selection of a driver.

20. The method according to claim 19, wherein, when the SoC of the first battery is greater than the first SoC or less than the second SoC, the first controller requests selection of the driver.

* * * * *